(12) United States Patent
Dardenne et al.

(10) Patent No.: US 11,721,880 B2
(45) Date of Patent: Aug. 8, 2023

(54) LAMINATED GLAZING PANEL HAVING AN ANTENNA

(71) Applicant: AGC GLASS EUROPE, Louvain-la-Neuve (BE)

(72) Inventors: Xavier Dardenne, Grez-Doice (BE); Dan Lis, Isnes (BE); Yvain Cornet, Woluwe-Saint-Lambert (BE); Shimo Kenichiro, Chiyoda Ku (JP); Bart Verbeeren, Gosselies (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 163 days.

(21) Appl. No.: 17/041,826

(22) PCT Filed: Mar. 29, 2019

(86) PCT No.: PCT/EP2019/058098
§ 371 (c)(1),
(2) Date: Sep. 25, 2020

(87) PCT Pub. No.: WO2019/185924
PCT Pub. Date: Oct. 3, 2019

(65) Prior Publication Data
US 2021/0028531 A1    Jan. 28, 2021

(30) Foreign Application Priority Data

Mar. 30, 2018 (EP) ...................... 18165320

(51) Int. Cl.
*H01Q 1/12* (2006.01)
*H01Q 9/40* (2006.01)
(52) U.S. Cl.
CPC ............ *H01Q 1/1271* (2013.01); *H01Q 9/40* (2013.01)

(58) Field of Classification Search
CPC .. H01Q 1/1271; H01Q 9/40; B32B 17/10036; B32B 17/10376
See application file for complete search history.

(56) References Cited

U.S. PATENT DOCUMENTS

| 6,239,758 B1 | 5/2001 | Fuchs et al. | |
| 2004/0227683 A1* | 11/2004 | Caimi | ..................... H01Q 9/40 343/742 |

(Continued)

OTHER PUBLICATIONS

International Search Report dated Jun. 3, 2019 in PCT/EP2019/058098 filed Mar. 29, 2019.

*Primary Examiner* — Awat M Salih
(74) *Attorney, Agent, or Firm* — Oblon, McClelland, Maier & Neustadt, L.L.P.

(57) ABSTRACT

A laminated glazing panel includes an outer pane of glass and an inner pane of glass, the inner pane of glass being laminated to the outer pane of glass by a thermoplastic interlayer. The panel further has an antenna structure including: (a) a feeding structure comprising at least one ground conductor and a signal conductor, the least one ground conductor being electrically isolated from the signal conductor by a gap, and (b) a radiator, fed by the feeding structure and electrically connected to the signal conductor. The panel also has a connector, to power the antenna structure, that includes a further conductor connected to the signal conductor, and at least one conductor connected to the at least one ground conductor. The radiator, the signal conductor and the extremity of the further conductor are provided on at least one of the surfaces of the inner faces of the glass panes.

19 Claims, 2 Drawing Sheets

(56) References Cited

U.S. PATENT DOCUMENTS

| | | | |
|---|---|---|---|
| 2007/0057848 A1* | 3/2007 | Maniwa | H01Q 1/40 |
| | | | 343/700 MS |
| 2016/0254586 A1 | 9/2016 | Shimo et al. | |
| 2017/0033433 A1* | 2/2017 | Winkelmann | H01Q 13/106 |
| 2017/0237147 A1 | 8/2017 | Song et al. | |
| 2017/0324138 A1* | 11/2017 | Talty | H01Q 1/3291 |
| 2018/0037007 A1* | 2/2018 | Droste | B32B 17/10036 |

* cited by examiner

LAMINATED GLAZING PANEL HAVING AN ANTENNA

The present invention relates to a laminated glazing panel comprising a thin wideband antenna within. More particularly, the present invention relates to a wideband antenna, fed by a planar transmission line, that are both included into the laminated glazing.

The present invention may be as well applicable to automotive field, and more generally speaking transportation (vehicle, train, plane, boat . . . ) as building field.

In the automotive field, modern vehicles employ various and many types of antennas to receive and transmit signals for different communications systems, such as terrestrial radio (AM/FM), cellular telephone, satellite radio, dedicated short range communications (DSRC), GPS, etc. Further, cellular telephone is expanding into 4G long term evolution (LTE) that requires at least two antennas to provide multiple-input multiple-output (MIMO) operation. The antennas used for these systems are often mounted to a roof of the vehicle so as to provide maximum reception capability. Further, many of these antennas are often integrated into a common structure and housing mounted to the roof of the vehicle, such as a "shark-fin" roof mounted antenna module. As the number of antennas on a vehicle increases, the size of the structures required to house all of the antennas in an efficient manner and providing maximum reception capability also increases, which interferes with the design and styling of the vehicle. Because of this, automotive engineers and designers have looked for other suitable areas on the vehicle to place antennas that may not interfere with vehicle design and structure.

One of those areas is the vehicle glass, such as the vehicle windshield, which has benefits because glass makes an acceptable dielectric substrate for an antenna and large surfaces are available. For example, it is known in the art to print AM and FM antennas on the glass of a vehicle where the printed antennas are fabricated within the glass as a single piece. However, those known systems are generally limited in that they could only be placed in a vehicle windshield and more particularly on the outer face of the inner pane of glass of the windshields or other glass surface in areas where viewing through the glass is not necessary.

Generally, when a planar antenna is placed in a laminated vehicle glazing, the planar antenna is placed on an external face of the glass and not within the laminated glazing. Thus, the antenna remains accessible. Furthermore, because of its external position, there is no limitation in term of space for additional element such as connector, or electronic components to be coupled to the antenna. Also, if post operation such as component soldering . . . are needed, the accessibility to the antenna and such component, is easy. More specifically, the available space allows to use conventional Radio Frequency (RF) cables, such as coaxial cable or similar, and suitable connectors to connect the antenna to the receiver.

In the case the antenna has to be positioned inside a laminated glazing, some issues arise. Indeed, once the antenna is placed, then there is less or no direct access to the antenna after assembly for further process operation, such as connection of the antenna to electronic equipment of the vehicle, through any RF cable and connector.

Thus, if an antenna has to be mounted into a laminated glazing, generally the three following solutions are available. The first solution consists in pre-assembling the antenna and the additional elements, such as connector, and then intercalating the whole antenna assembly between the glass panels before glasses lamination. Most of these kind of assemblies available consist in flat antennas, built on a very thin substrate, such as a thin dielectric foil (antenna manufacturing process is therefore totally independent of the glass), and connected to a RF connector. However, these assemblies are usually too thick to be laminated reliably between at least two panes of glasses. Aside from the connector, even if the antenna assembly thickness itself is not the limiting factor, large surface antenna foils can lead to issues during the manufacturing process (positioning accuracy, delamination, water ingress, . . . ). Therefore, antennas that are built directly on the glass surface are preferred for assembly integrity and positioning accuracy reasons.

The second solution includes depositing an antenna and optional feeding conductors directly on the glass, and connecting this antenna or feeding conductors to a connector. The assembly is then laminated between the two panes of glass. In this case, when the antenna is deposited on the glass by manufacturing technique (metallic printing, or coating, . . . ), the main constraint is about the mean to connect the antenna to electronic circuit behind. Indeed, in such cases, the classical connectors used to connect the embedded antenna to external electronic devices consist in a simple, flat conducting band (Kapton type), that is sufficiently thin so as to not cause any of the above mentioned issues with the lamination process. The drawback is that such Kapton bands, made of a single conductor cannot guide RF energy and are therefore radiating. They must then be considered as part of the antenna itself, and will impact both radiation properties as well as the matching of the antenna input impedance to the impedance of connected electronic devices. However, it is almost impossible to accurately take these Kapton bands into account during the antenna optimization process due to their flexible nature. It is indeed not possible to predict accurately their shape and position after assembly in the vehicle.

The third solution available, which avoids radiation of the feeding connector is to resort to RF coaxial cables. However, as these cables are way too thick to be laminable, the only solution consists in exciting the antenna by proximity coupling. This method is known, but in order to be effective at high frequency, it requires a very high accuracy on the antenna/connector parts positioning and alignment, which can usually not be achieved with classical glass manufacturing processes.

Thus, placing an antenna structure comprising a planar antenna and its feeding structure (feeding conductor(s) and connector) within a laminated glazing represents a big challenge since the space between the two (or more) panes of glass is typically lower than 1 mm (generally depending on the thickness of the thermoplastic interlayers used). Furthermore, the thermoplastic interlayer used to laminated the at least two panes of glass such as polyvinyl butyral (PVB) interlayer is a hard sheet having a very limited capability for compression. On top of that, for automotive application, the laminated glazing may be thin, sometimes less than 2 mm thick, and surface stresses due to mechanical constraints may occur because of the presence of different components with different thicknesses within the laminated assembly. These kind of surface stresses should be limited to a minimum to avoid structural weaknesses and damages to the glazing. The risk during the lamination process is that the assembly comprising the antenna and the feeding connector is not thin enough to fit between the two panes of glass without degrading the quality of the laminated glazing (i.e. degrade the lamination assembly robustness, risk of delamination, water ingress, etc . . . ). Therefore, the whole laminable antenna structure should be thin enough, ideally being a small fraction of interlayer thickness in order not to have to cut this interlayer (over cost and process constraints to shape the interlayer . . . ) and degrade the lamination quality (glass integrity) to fit with the final thickness of the glazing.

Thus, there is a real need for thin antenna structures comprising an antenna radiator element operating in a wide range of frequencies, connected to a radio frequency (RF) cable through an appropriate planar, non-radiating feeding structure, with good impedance matching, and being laminable within a laminated glazing, more particularly within a thin laminated glazing suitable for as well automotive windshield as building field.

For simplicity, the numbering of the laminated glazing in the following description refers to the numbering nomenclature conventionally used for glazing. Thus, the face of the glazing of the outer pane of glass in contact with the environment outside the vehicle is known as the face 1 and the surface of the glazing, of the inner pane of glass, in contact with the internal medium, that is to say the passenger compartment, is called face 4. The inner face of the outer pane of glass is called face 2 and the inner face of the inner pane of glass is called face 3.

For avoidance of doubt, the terms "external" and "internal" refer to the orientation of the glazing during installation as glazing in a vehicle.

Also for avoidance of doubt, the present invention is applicable for all means of transport such as automotive, train, plane, building, façade . . . .

The present invention relates to a laminated glazing panel comprising:
an outer pane of glass having an outer and an opposite inner faces,
an inner pane of glass, having an outer and an opposite inner faces, the inner pane of glass being laminated to the outer pane of glass by a thermoplastic interlayer,
an antenna structure comprising:
  a. a feeding structure comprising at least one ground conductor and a signal conductor, the least one ground conductor being electrically isolated from the signal conductor by a gap,
  b. a radiator fed by the feeding structure and electrically connected to the signal conductor,
a connector, to power the antenna structure, through the feeding structure, comprising at least one conductor connected to the signal conductor, and at least one conductor connected to the at least one ground conductor, at their extremities.

According to the present invention, the radiator of the antenna structure, the signal conductor of the feeding structure and the extremity of the conductor are provided on at least one of the surfaces of the inner faces (2b, 3b) of the outer and/or the inner panes of glass (2, 3) of the laminated glazing panel (1).

According to one embodiment of the present invention, the at least one ground conductor, also called ground plane conductor, can be located on any face of the inner or outer glass panes. The extremities of conductors of the connector, connected to the at least one ground conductor are located along the same glass surface as the at least one ground conductor to which it must be electrically connected.

According to one embodiment of the present invention, the feeding structure comprises at least two ground planes conductors, the ground conductors being opposite in the same plane, the extremities of conductors of the connector (10) are then connected to the at least two ground planes conductors and the extremities of conductors (12) of the connector (10) connected to the at two ground planes conductors being not in contact with the signal conductor. Then, the ground planes conductors may be provided in opposite side of the pane of glass wherein the signal conductor is provided on the opposite pane of glass.

Thus, the present invention proposes a thin antenna structure comprising an antenna radiator operating in a wide range of frequencies, connected to a radio frequency (RF) cable through an appropriate planar transmission line with good impedance matching and being laminable within a laminated glazing, more particularly within a thin laminated glazing suitable for as well automotive windshield as building field.

Additional features of the present invention will become apparent from the following description and appended claims, taken in conjunction with the accompanying drawings.

The following description of the embodiments of the invention directed to a thin, planar wideband antenna suitable to be laminated within a laminated glazing is merely exemplary in nature, and is in no way intended to limit the invention or its applications or uses. For example, the description herein talks about the antenna being applicable to a laminated automotive glass. However, as will be appreciated by those skilled in the art, the antenna will have application for other laminated glazing other than automotive structures and other than transparent or translucent surfaces.

According to a preferred embodiment of the present invention, the radiator and the feeding structure conductors of the planar transmission line are printed, or coated on at least one of the faces of the outer and/or the inner panes of glass.

Thus, the radiator and the feeding structure conductors are deposited directly on the glass during the glass manufacturing stage with well-known and mastered technologies such as printing, coating by PCVD, CVD, ion implantation technologies. Radiator and the feeding structure conductors are made of a conductive material deposited on the glass during the glass manufacturing stage with preferably a thickness lower than 100 μm.

The radiator and the feeding structure conductors may be made in the same conductive material or different conductive materials.

In a preferred embodiment, the radiator and the feeding structure conductors are made of silver based materials.

In another embodiment of the present invention, the radiator and the feeding structure conductors are made within the conductive coating such as silver coating usually used for heated coated glazing by decoating some zones of the coating.

In another embodiment of the present invention, the radiator is made of a full piece of conductive material.

In another embodiment of the present invention, the radiator is made of a wire of conductive material delimiting the design of the radiator.

In yet another embodiment of the present invention, some conductors of the radiator and/or the feeding structure are made of deposited silver based materials, while the others are made within the conductive coating.

In a preferred embodiment of the present invention, the feeding structure for feeding the antenna radiator is implemented in the form of a coplanar waveguide (CPW) made of conductive tracks (metallic print, conductive coating, . . . ) provided on the same glass surface as the radiator, ideally an inner face, (face 2 or 3 according to usual glazing nomenclature), of the outer or inner pane of glass.

In another preferred embodiment, the feeding structure is implemented as a microstrip line whose signal and ground conductors are made of conductive tracks (metallic print, conductive coating, . . . ). The signal conductor lies preferably on the same glass face as the radiator (ideally the inner face (face 2 or 3 according to usual glazing nomenclature) of the outer or inner panes of glass), while the ground conductor can be implemented on any face of the laminated assembly, provided that it doesn't lie in the same face as the radiator element.

The embedded feeding structure conductors are optimized in shape and dimensions in order to make an adequate connection with the external connector, both in terms of physical dimensions, and of impedance matching. In particular, the feeding structure conductors can be optimized in order to perfectly match the impedances between the antenna and the outer connector, therefore improving antenna performance.

Thus, the present invention proposes solution to efficiently integrate an antenna structure and its feeding transmission line within a laminated glazing. In comparison with known technologies and more particularly in comparison with the use of foil antennas, the main advantage is that the whole assembly comprising the radiator and its feeding structure can be made thinner and remove the risks related to lamination (delamination, water ingress, increased risk of breakage caused by tensions in the laminate).

According to one embodiment of the present invention, the antenna structure comprises at least one slot provided within the radiator. The at least one slot may have a rectangular shape, U-shape, L-shape or any shape suitable to enlarge the frequency band of operation, or increase the number of frequency bands of operation.

According to one embodiment of the present invention, the radiator comprises further at least a thin conducting wire. The at least one wire provided further in the radiator is added when access to low frequencies is desired, i.e. frequencies corresponding to wavelength significantly larger than the size of the main radiator part. The wire may be electrically connected to the main radiator part, or proximity coupled. The wire can also be coupled to other metallic parts surrounding the radiator, for example to heated wires of a glazing if present . . . . The wire type may be a metallic wire, such as a copper wire, or a printed thin conductor.

According to one embodiment of the present invention, the feeding structure comprises three ground planes conductors and a signal conductor, resulting to a grounded co-planar waveguide.

According to one embodiment of the present invention, the laminated glazing further comprises a reflector. The reflector is provided on a face of the glazing wherein the radiator is not present.

According to one embodiment of the present invention, the connector used to electrically couple the feeding structure with external electronic devices, such as an RF receiver, an RF amplifier or alike, and to power the antenna structure is a flat radio frequency (RF) type connector. The RF connector preferably comprises at least two conductors and is designed as a transmission line, which has the advantage to guide RF energy between the antenna and the electronic devices with minimal radiation. The extremities of the connector conductors are preferably sufficiently thin to be laminated into the glazing.

According to the present invention, the connector and the feeding structure are designed and optimized to match the impedance of the antenna structure to the impedance of the electronic devices (low reflection of the signal).

According to the present invention, the connector is compatible with various antenna types (the antenna radiator and feeding signal conductor can be e.g. printed, made in the coating, and/or associated to heating function of the glazing).

Thus, the combination of the radiator, the feeding structure, and the connector are suitable for a wide range of frequencies from KHz to tens of GHz.

According to one embodiment of the present invention, the coupling of the radiator and the feeding structure of the antenna assembly, and in particular the feeding transmission line, to the connector is made by direct contact during the lamination process of the laminated glazing. Thus, there is no need to solder the connector to the feeding transmission line conductors, the process of connecting the antenna to the feeding electronic devices is consequently facilitated.

According to one embodiment of the present invention, the connector conductors, used to feed the antenna and connected to the feeding structure conductors are made of copper.

The shape and size of radiator and feeding structure conductors to couple energy to the radiator structure are designed according to selected frequency bands. More particularly, the radiator dimensions are chosen so as to provide sufficient signal reception and transmission in the frequency bands of interest.

The present invention will now be more particularly described with reference to drawings and exemplary embodiments, which are provided by way of illustration and not of limitation. The drawings are a schematic representation and not true to scale. The drawings do not restrict the invention in any way. More advantages will be explained with examples.

As will be discussed in detail below, the present invention proposes a printed wideband antenna on the windshield 1 as laminated glazing. However any other vehicle's laminated window or building's laminated glazing, where the antenna structure according to the invention is provided and where the antenna can be mounted is covered by the present invention. As will become apparent, the antenna provided on the laminated glazing may be operable for various communications systems, such as AM/FM radio antennas, DSRC antennas, satellite radio antennas, GPS antennas, 4G or 5G cellular antennas, including MIMO antennas, etc. In one embodiment, the antenna is a wideband monopole appliqué antenna that is installed directly on the surface of the dielectric structure by a suitable adhesive. The disclosed antenna can be designed to operate on automotive glass of various physical thicknesses and dielectric properties, where the antenna only operates as intended when installed on the glass since in order to get adequate impedance, the antenna geometry strongly depends on the dielectric substrate properties.

Figure 1:
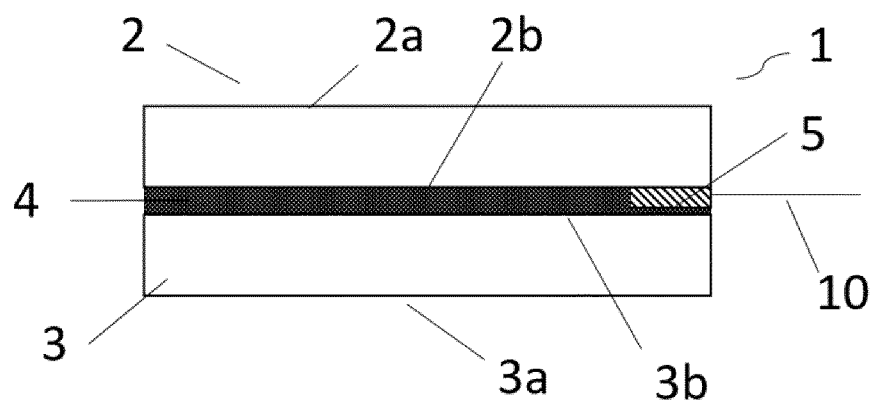
FIG. 1 is a profile view of an embodiment of the glazing panel comprising an antenna structure according to the present invention.

FIG. 1 is a profile view of an antenna structure 5 including a windshield 1 having an outer pane of glass 2, an inner pane of glass 3 and a polyvinyl butyral (PVB) layer 4 therebetween. The structure 5 is provided in the inner face 3b of the inner pane of glass 3. The structure 5 may be also provided in the inner face 2b of the outer pane of glass 2. The antenna structure 5 is preferably provided in at least one edge of the laminated glazing wherein the antenna structure 5 is not in a visible area or in a zone with a minimal impact on the appearance with an access to a connection to a power supply device for providing a feed power.

An antenna connector, (not shown to not overload the FIG. 1) is connected to the antenna 5 and may be any suitable RF connector. Although the antenna 5 is shown being coupled to an inner 3b surface of the inner pane of glass 3, the conductor 6 as described below can be adhered to the outer surface of the outer glass 2.

The antenna structure 5 can be formed by any suitable low-loss conductor, such as copper, gold, silver, silver ceramic, etc. The antenna structure 5 can be any suitable transparent conductor, such as indium tin oxide (ITO), silver nano-wire, zinc oxide (ZnO), etc. Performance of the antenna structure 5 when it is made of a transparent conductor could be enhanced by adding a conductive frame along some edges of the antenna 5 as is known in the art.

The thickness of automotive glass may vary over 2.8 mm-5 mm. The antenna 5 may include a single layer conductor and a feeding structure to excite the antenna radiator 9. By providing the antenna structure and the conductors elements on the inner surface of the vehicle windshield 1, degradation of the antenna 5 can be reduced from environmental conditions.

Figure 2:
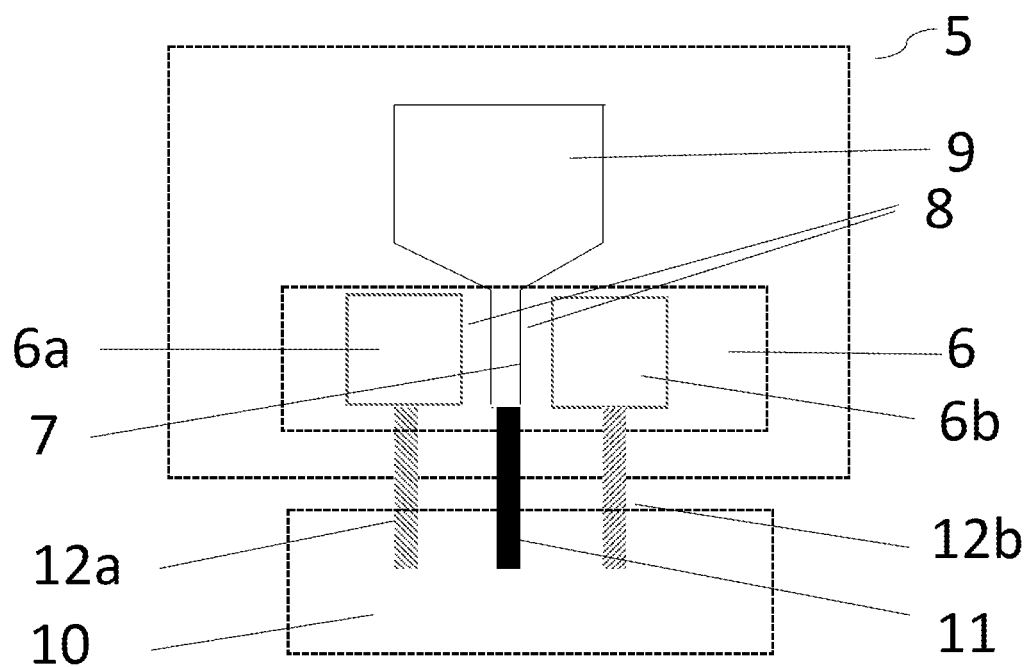
FIG. 2 is a top view of an example of an antenna structure according to the invention.

FIG. 2 is a top view of an example of an antenna structure 5 according to the invention including a feeding structure 6 having opposing ground planes 6a and 6b and a signal conductor 7 extending therebetween that is electrically isolated from the planes 6a and 6b by a gap 8, where a connector 10 comprises conductors 12a and 12b coupled to the ground planes 6a et 6b, and a conductor 11 coupled to the signal conductor 7. A specially configured radiator 9, here pentagon-shaped, fed by the feed structure 6 is electrically coupled to the signal conductor 7 at a tip of the radiator 9, as shown, where the radiator 9 flairs to a dimension that provides signal reception and transmission in the frequency band of interest According to this embodiment, the antenna structure may be placed on the inner face (face 2) of the outer glass of pane 2 or on the inner face (face 3) of the inner pane of glass 3, the 2 panes of glass being separated by at least one thermoplastic interlayer.

Thus, according to the present invention, the radiator 9 of the antenna structure 5, and the signal conductor 7 of the feeding structure 6 are provided on at least one of the surfaces of the inner face of the outer and/or the inner panes of the laminated glazing panel (2, 3) (i.e. on faces 2 or 3 according to the usual glazing nomenclature) and the extremity of the conductors 11 and 12 of the connector 10 are laminated between the glass panes 2, 3 along the same surface as the signal conductor 7 to which it is electrically connected. According the present invention, the connector 10 connected to the antenna structure through the conductors 11, 12a and 12b allows to feed power the antenna structure 5 by being connected to a power supply device.

According to another embodiment of the present invention, the radiator 9 of the antenna structure 5, and the signal conductor 7 of the feeding structure 6 are provided on the thermoplastic interlayer 5.

In the automotive field, antennas are used to send and/or to receive information such as radio, TV or cell phone signals (GSM) but also to communicate with the vehicle, i.e. to be able to open car doors without having to insert the key, with other vehicles, i.e. to keep a distance between to vehicle, or with the environment, i.e. tolls, traffic lights, . . . .

The antenna size is usually fraction of the wave length ($\lambda$) of its operating frequency, typically $\lambda/2$ or $\lambda/4$.

Modern cars may contain multiple antennas for analog audio broadcasts (amplitude modulated (AM—0.5-1.7 MHz) and frequency modulated (FM—76-108 MHz), global positioning system (GPS—1575 MHz) data, cellular phone communication, e.g. global system for communication (GSM—800/1800 MHz), long term evolution (LTE—800/1800/2600 MHz), digital audio broadcasting (DAB—170-240 MHz), remote keyless entry (RKE—315/433 MHz), television reception, tire pressure monitor system (TPMS—315/433 MHz), automotive radar (22-26 GHz/76-77 GHz), car to car communication (C2C—5.9 GHz), etc.

Figure 3:
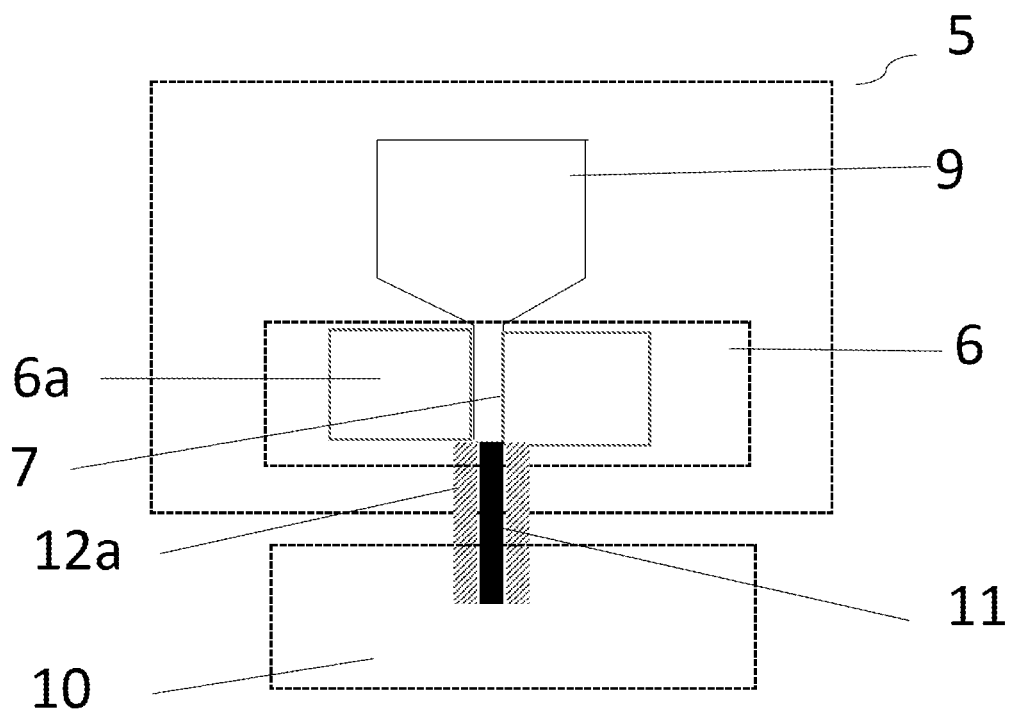
FIG. 3 is a top view of another example of an antenna structure according to the invention.

FIG. 3 is a top view of another example of an antenna structure 5 according to the invention including a feed structure 6 having one ground plane made of one piece 6a and a signal conductor 7 electrically isolated from the ground plane 6a by a gap 8. According to the present embodiment, the gap 8 may be defined by the gap between the ground plane placed in one face of one of the panes of glass 2, 3 and the radiator and the signal conductor 7 placed in an opposite face of the face wherein the ground plane is placed. For example, the radiator 9 and the signal conductor 7 are placed in face 2 (inner face) of the outer glass of pane 2 and the ground pane 6a is placed in face 3 (inner face) of the inner pane of glass 3, the 2 panes of glass being separated by at least one thermoplastic interlayer. Generally speaking, the gap 8 means that the ground plane conductor and the signal conductor are not in contact.

Alternatively, The radiator 9 and the signal conductor 7 may be placed in face 2 (inner face) of the outer glass of pane 2 and the ground pane 6a is placed in face 4 (outer face) of the inner pane of glass 3.

In another embodiment, the radiator 9 and the signal conductor 7 may be placed in face 3 (inner face) of the inner glass of pane 3 and the ground pane 6a is placed in face 4 (outer face) of the inner pane of glass 3.

In another embodiment, the radiator 9 and the signal conductor 7 may be placed in face 2 (inner face) of the outer glass of pane 2 and the ground pane 6a is placed in face 1 (outer face) of the outer pane of glass 2.

The connector 10 comprises a conductor (feed lines) 12a coupled to the ground plane 6a, and a conductor 11 coupled to the signal conductor 7. A specially configured radiator 9, here pentagon-shaped, fed by the feed structure 6 is electrically coupled to the signal conductor 7 at a tip of the radiator 9, as shown, where the radiator 9 flairs to a dimension that provides signal reception and transmission in the frequency band of interest.

According to the present invention, the pane of glass can be a flat or curved panel to fit with the design of the car or the building. The pane of glass can be laminated to respect with the specifications of security. A heatable system, for example a coating or a network of wires or silver print on a pane of glass, can be applied on the pane of glass to add a defrosting function for example. Also, the pane of glass can be a clear glass or a colored glass, tinted with a specific composition of the glass or by applying a coating or a plastic layer for example.

The invention claimed is:

1. A laminated glazing panel comprising:
   an outer pane of glass having an outer face and an opposite inner face, an inner pane of glass, having an outer face and an opposite inner face, the inner pane of glass being laminated to the outer pane of glass by a thermoplastic interlayer, an antenna structure comprising:
a. a feeding structure comprising at least one ground conductor and a signal conductor, the at least one ground conductor being electrically isolated from the signal conductor by a gap,
b. a radiator, fed by the feeding structure and electrically connected to the signal conductor, and a connector, to power the antenna structure, through the feeding structure, comprising at least one additional conductor connected to the signal conductor, and at least one further conductor connected to the at least one ground conductor, at their extremities, wherein at least the radiator of the antenna structure, and the signal conductor of the feeding structure and the extremity of the additional conductor are provided on at least one of the surfaces of the inner faces of the outer and/or the inner panes of glass of the laminated glazing panel, wherein the radiator and the feeding structure conductors are deposited directly on the glass, and wherein the signal conductor lies on a same glass face as the radiator, while the ground conductor is implemented on any glass face of the laminated assembly provided that the ground conductor does not lie on the same glass face as the radiator.

2. The glazing panel according to claim 1, wherein the radiator comprises a slot and a tip, the radiator being coupled to the signal conductor through the tip.

3. The glazing panel according to claim 2, wherein the radiator comprises further a conducting wire.

4. The glazing panel according to claim 1, wherein the connector is a flat radio frequency type connector.

5. The glazing panel according to claim 1, wherein there are at least two ground conductors, and the radiator and the at least two ground conductors, and the signal conductor are printed or coated on at least one of the inner faces of the outer and/or the inner panes of glass.

6. The glazing panel according to claim 5, wherein the coupling of the signal conductor and the at least two ground conductors to the connector are made by contact during a lamination process.

7. The glazing panel according to claim 1, wherein the radiator and the feed structure of the antenna structure are made of a same conductive material or different conductive materials.

8. The glazing panel according to claim 1, wherein the radiator and the feeding structure of the antenna structure comprise silver.

9. The glazing panel according to claim 1, wherein there are at least two further conductors, and the at least two ground conductors of the feeding structure comprise at least two opposing ground plane conductors, the at least two ground plane conductors being connected to extremities of the at least two further conductors of the connector, the at least two ground plane conductors being not in contact with the signal conductor.

10. The glazing panel according to claim 1, wherein the feeding structure is a co-planar waveguide.

11. The glazing panel according to claim 1, wherein the feeding structure is a microstrip line.

12. The glazing panel according to claim 1, wherein the antenna structure operates in a frequency band for a dedicated short range communications system, a GPS system, or a long term evolution (LTE) cellular system.

13. The glazing panel according to claim 1, wherein the laminated glazing is an automotive glazing.

14. The glazing panel according to claim 13, wherein the laminated glazing is a windshield.

15. The glazing panel according to claim 1, wherein the laminated glazing is a building glazing.

16. The glazing panel according to claim 1, wherein the radiator and the feeding structure conductors are deposited directly on the glass by a process selected from the group consisting of printing, PCVD, CVD, and ion implantation.

17. The glazing panel according to claim 1, wherein the radiator and the feeding structure conductors have a thickness lower than 100 µm.

18. The glazing panel according to claim 1, wherein the radiator and signal conductor are placed on an opposite glass face of a face where the ground conductor is placed.

19. The glazing panel according to claim 1, wherein the radiator and signal conductor are placed on glass face 2 (the inner face of the outer pane of glass) and the ground conductor is placed on glass face 3 (the inner face of the inner pane of glass).

* * * * *